E. L. DUNN.
AUTOMATIC ELEVATOR.
APPLICATION FILED FEB. 28, 1911.

1,234,644.

Patented July 24, 1917.
6 SHEETS—SHEET 1.

E. L. DUNN.
AUTOMATIC ELEVATOR.
APPLICATION FILED FEB. 28, 1911.

1,234,644.

Patented July 24, 1917.
6 SHEETS—SHEET 2.

Witnesses:
Helen Egan
Peter A. Roe

Inventor
Edward L. Dunn,
By his Attorneys
Edwards, Sager & Wooster

E. L. DUNN.
AUTOMATIC ELEVATOR.
APPLICATION FILED FEB. 28, 1911.

1,234,644.

Patented July 24, 1917.
6 SHEETS—SHEET 6.

Witnesses:
Helen C. Egan
Peter A. Roe

Inventor
Edward L. Dunn,
By his Attorneys
Edwards, Sager & Wooster

UNITED STATES PATENT OFFICE.

EDWARD L. DUNN, OF WORCESTER, MASSACHUSETTS, ASSIGNOR, BY MESNE ASSIGNMENTS, TO STANDARD PLUNGER ELEVATOR COMPANY, OF WORCESTER, MASSACHUSETTS, A CORPORATION OF MASSACHUSETTS.

AUTOMATIC ELEVATOR.

1,234,644.   Specification of Letters Patent.   Patented July 24, 1917.

Application filed February 28, 1911. Serial No. 611,371.

*To all whom it may concern:*

Be it known that I, EDWARD L. DUNN, a citizen of the United States, residing at Worcester, in the county of Worcester and State of Massachusetts, have invented certain new and useful Improvements in Automatic Elevators, of which the following is a full, clear, and exact specification.

This invention relates to elevators, and more particularly has reference to means whereby a hydraulic elevator may be started by electrical or mechanical connections and automatically stopped at a predetermined floor, and also whereby the machine may be controlled manually in both starting and stopping in case of necessity, suitable interlocking mechanism being provided, whereby when the automatic system is operative the mechanical connections are inoperative, and vice versa.

As herein shown, the invention is applied to a hydraulic elevator of the plunger type, though it is to be understood that the invention, in so far as it relates to devices for operating a main valve, is applicable to any type of elevator employing such a valve.

In carrying out the invention, I have provided in connection with a hoisting cylinder and main three-way valve of well known construction, an electrically controlled pilot valve mechanism for opening the main valve, and mechanical devices released at a predetermined time by the movement of the car to mechanically close the main valve by the momentum of the car. When the valve is opened to send the car to a predetermined floor, the electrical controlling devices at all floors and on the car are inoperative, so that interference is prevented. A particular feature of the invention resides in means whereby the electrical controlling devices remain inoperative during the period of mechanical closing of the main valve, as ordinarily, the opening of the holding circuits would throw the push buttons back into operation, even though the main valve is not closed. In order to mechanically close the main valve, it has its stem connected through a rack and pinion to a standing rope in the hatchway, and the car is provided with means for clutching the rope at a predetermined time and thereby continued movement of the car closes the main valve. Suitable adjustments are provided for effecting accurate stops.

In case of failure or disarrangement of the automatic controlling devices, it is possible to open and close the main valve by the standing rope, but this cannot be done until the electrical devices are disconnected. When the electrical mechanism is operative, the valve cannot be manually operated.

The invention will be more fully understood in connection with the description of the accompanying drawings, wherein—

Figure 1:
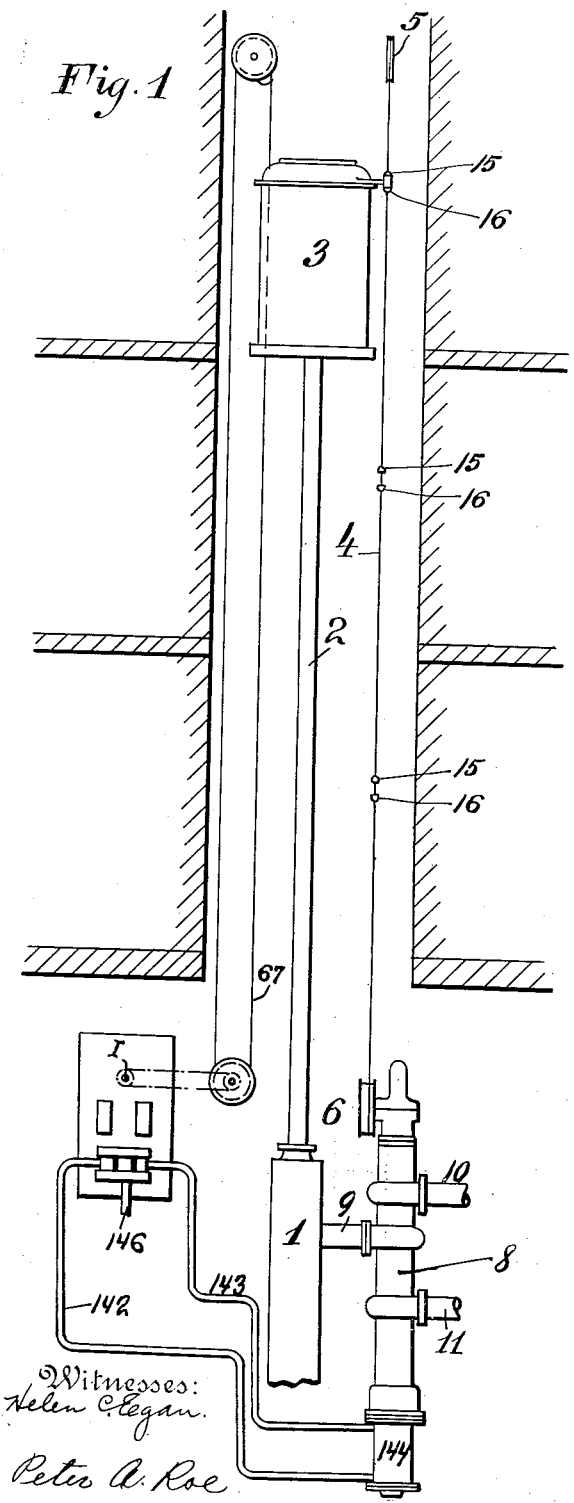
Figure 1 is an elevation of an elevator equipped with the invention.
Figure 2:
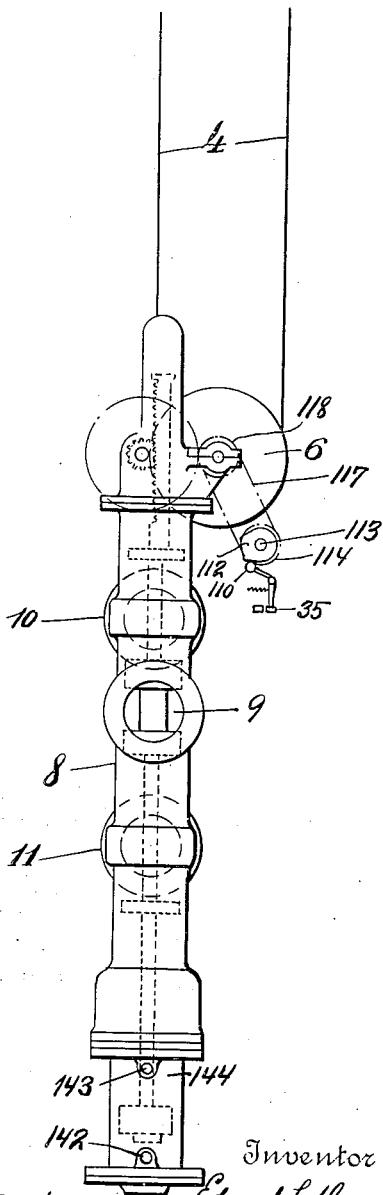
Fig. 2 shows the main valve and actuating parts.
Figure 3:
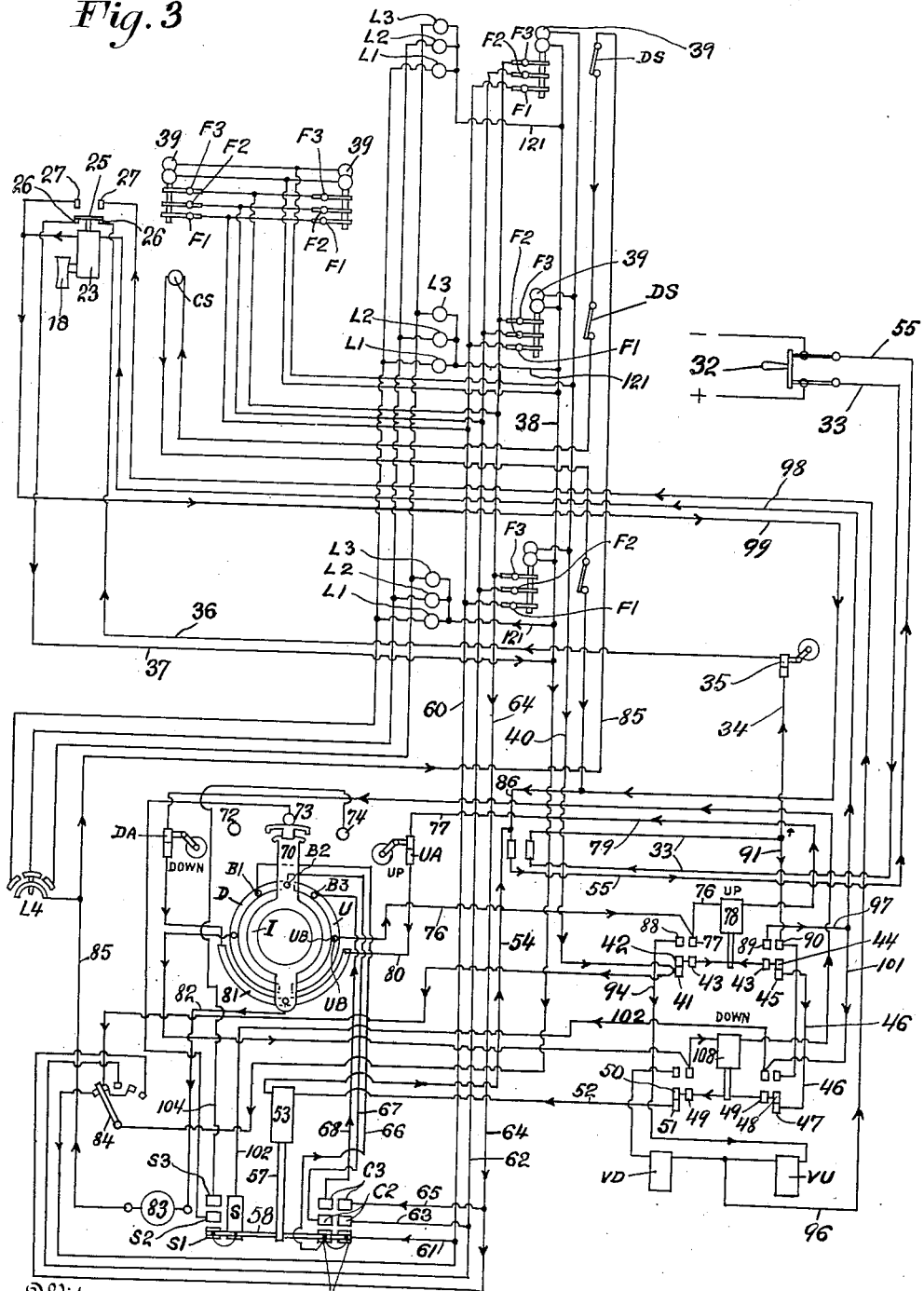
Fig. 3 is a diagrammatic view of the circuits and parts.

1 represents the main hoisting cylinder having a plunger 2 reciprocating therein, and 3 is the car carried at the upper end of the plunger and moving between suitable guides. 4 represents a rope in the hatchway extending over a top sheave 5 and over a bottom sheave 6. The sheave 6 is mounted on a shaft which carries a pinion, and the pinion is geared to a rack attached to the stem of a main three-way valve 8. The valve 8 is connected by to and from pipe 9 with the cylinder 1, and has an inlet 10 and exhaust 11. These parts are of usual and well known construction and need not be specifically referred to herein.

Figure 6:
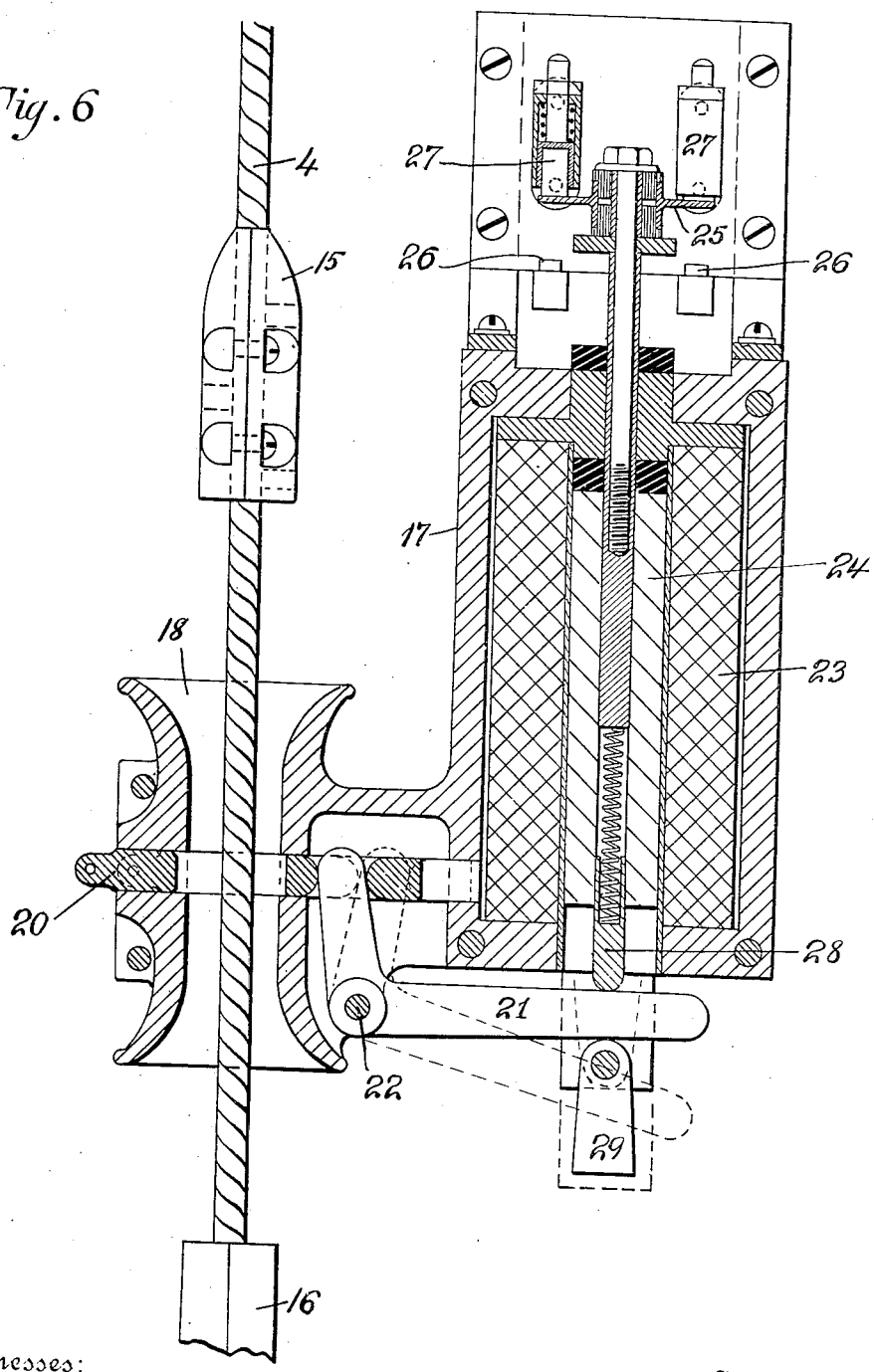
Fig. 6 represents the rope clutching mechanism on the car.

In order to operate the main valve manually, it will be seen that it is only necessary for the operator to move the rope 4 up or down, in the usual manner. The rope 4 is provided with a series of up stop buttons 15 and a series of down stop buttons 16, which are adjustable to make accurate stops. The car is provided with a frame work 17 carrying a thimble 18 having a passage of such diameter as to permit the buttons 15 and 16 to pass through. 20 is a clutch member in the form of a sliding ring, which is operated by a lever 21, pivoted at 22. 23 is a solenoid winding, and 24 a core carrying at its upper end a double switch arm 25 which bridges in lower position contacts 26, 26, and in upper position contacts 27, 27. The lower end of the core 24 is slotted and carries a spring-pressed pin 28, and a pivoted cam 29, between which is inserted the end of the lever 21. When the core is lifted, as in the position shown, the lever 21 and the ring 20 are thrown to position shown in solid lines, allowing the buttons 15, 16 to pass freely through the thimble 18. When the core is deënergized it falls to the dotted position, throwing the ring 20 across the passage in thimble 18 and permitting it to engage the buttons as the car progresses. In order to throw the ring 20 out of operation when the car is to be started and stopped by the rope, the cam 29 is lifted to the dotted position shown in Fig. 6, which holds the ring 20 in position to permit free passage of buttons 15 and 16 and holds the switch member 25 out of connection with the contacts 26, 26, thereby preventing operation of the electrical controlling devices, as will more fully appear. When the electrical devices are in opertaion, with the cam 29 in its lower position, the ring 20 is controlled by the solenoid core 24, being in the position shown when the solenoid winding 23 is energized and in dotted position when the solenoid 23 is deënergized.

I will now describe the electrical controlling system operated by push buttons, which enables the pilot valve to open the main valve and permits the main valve to be automatically and mechanically closed by the engagement of buttons 15 or 16 with the ring 20. $F^1$, $F^2$, $F^3$ represents sets of push buttons in multiple, and herein shown as located at three floors, and also in duplicate upon the car. 32 is a main line switch connected by wire 33 to wire 34, through valve switch 35 (hereafter to be described), wire 36 to contact 26, then by switch blade 25 to wire 37, wires 37, 38, switches 39 to the various push buttons $F^1$, $F^2$, $F^3$ etc., the switch 39 being closed at the same time that any one of the push buttons is closed. From the switches 39 leads a wire 40 to contacts 41, 42, 43, 43, 44, 45, wire 46, contacts 47, 48, 49, 49, 50, 51, wire 52, to commutator solenoid 53, thence by wire 54 to return wire 55. The solenoid 53 carries a plunger 57 and a crosshead 58, which moves over pairs of contacts $C^1$, $C^2$, $C^3$, corresponding to the various floors, and also on the other side sets of stop contacts S, $S^1$, $S^2$, $S^3$, etc., corresponding to the various floors. The push buttons $F^1$ are all connected by wires 60, 61 to contacts $C^1$, and push buttons $F^2$ by wires 62, 63 to contacts $C^2$, and push buttons $F^3$, by wires 64, 65 to contacts $C^3$. From the left hand contacts $C^1$, $C^2$, $C^3$, wires 66, 67, 68 lead to brushes $B^1$, $B^2$, $B^3$, etc., corresponding to the number of floors. These brushes bear on direction rings D, U, which are rotated by a rope 67 or other connections synchronously with the car, and in one or the other direction corresponding to that of the car. Also connected to rotate with the rings D, U is an indicator arm I, having a contactor 70 which successively contacts with stop contacts 72, 73, 74, corresponding to the number of floors. The stop at the terminals can also be made on the up or down automatics UA, DA, respectively.

As before stated, the closing of a switch 39 simultaneously with the closing of any push button, energizes the commutator solenoid 53, causing the crosshead 58 to be lifted to connect the various pairs of contacts $C^1$, $C^2$, $C^3$, etc. If the push button $F^3$ were pushed, the current passes through push button contacts to wire 64, 65, contacts $C^3$ (as soon as connected across by crosshead 58,) then by wire 68 to brush $B^3$, then to up ring U, through up brush UB to wire 76 to contact 77, up direction magnet 78, wire 79, up automatic UA, wire 80 to ring 81, then by wire 82 to solenoid 83, controlling a magnetic clutch for holding the cross head in raised position while the car is running, thence by wire 85 through door switches DS, wire 86, and return wire 55. The up magnet 78 having thus been energized, its core is lifted, so that the blade carrying contacts 42, 43, 43, 44, is lifted, bringing 42 in contact with 88, lefthand contact 43 with 77, righthand contact 43 with 89, and 44 with 90. The circuit of magnet 78 is maintained through wire 91, leading from wire 33, contacts 90, 44, 43, 43, 77, wires 76, 79, 80, ring 81, wire 82, magnet 83, wire 85, door switches DS, and wire 86 to wire 55. When 42 touches 88 the circuit from 90 through 44, 43, 43, 42 and 88, feeds wire 94 to up pilot valve solenoid VU, and thence by wire 96 to contacts 27. At the same time that up magnet 78 is held energized through wire 91, current from contact 90 passes through 44, 43 and 89 to wires 97, 98 to solenoid 23, thence by wire 99 to 86, and return as before. This circuit energizes the car clutch solenoid 23 to open contacts 26 and close contacts 27, it being seen that the solenoid 23 is held energized as long as magnet 78 is energized. The opening of contact 26 opens the circuit through valve switch 35, and also wires 36, 37 to the push button supplying wire 38, so that as long as contacts 26 remain open the push buttons are inoperative. The stop at the predetermined floor is effected by the contactor 70 striking the contact 74, and establishing a short-circuit around magnet 78, through wires 101, 102, contact S, crosshead 58 to contact $S^3$, thence by wire 104 to contact 74, thence through contactor 70 to ring 81, thence by wires 82, 85, door switches DS, and car switch CS to wires 86 and 55. The completion of this short circuit restores all of the parts heretofore described, and would render them capable of being again operated from any of the floors before the car has actually come to rest. To prevent this, a switch 35 is placed in the wire 36, and this switch is opened upon movement of the main valve in either direction from its central closed position, and remains open until the main valve has actually returned to center and stopped the car. Thus, the deënergization of magnet 23 does not throw the push buttons back into operation, even though the direction magnet has been deënergized. It will thus be seen that the contactor 70 will be set to short circuit the magnets 78 or 108 (or open the up or down automatics UA, DA) in advance of the actual stopping of the car, and the effect of such circuit opening is to release the car clutch and pilot valve so that the ring 20 can engage the stop buttons and positively throw the main valve back to center. It will also be seen that the opening of any door switch DS prevents starting of the car, as also does the opening of the car switch CS.

The start of the car down through the down direction magnet 108 and the down pilot valve magnet VD would be effected in similar manner, and the circuits can be easily traced out, it being thought unnecessary to fully describe them.

Figure 7:
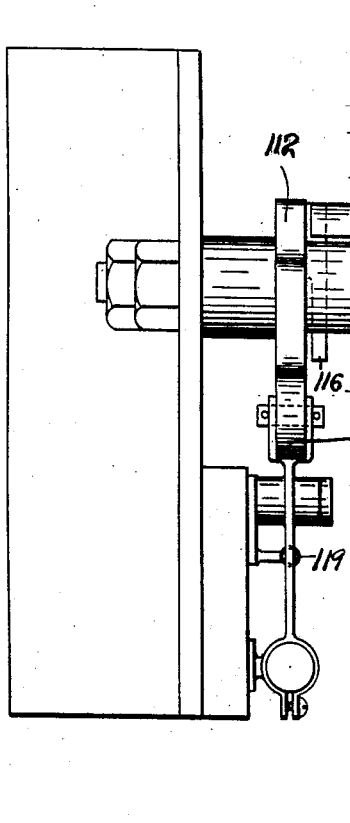
Figs. 7 and 8 represent the details of a switching mechanism operated by the main valve, and preventing the operation of the electrical devices except when the main valve is in closed position.
Figure 8:
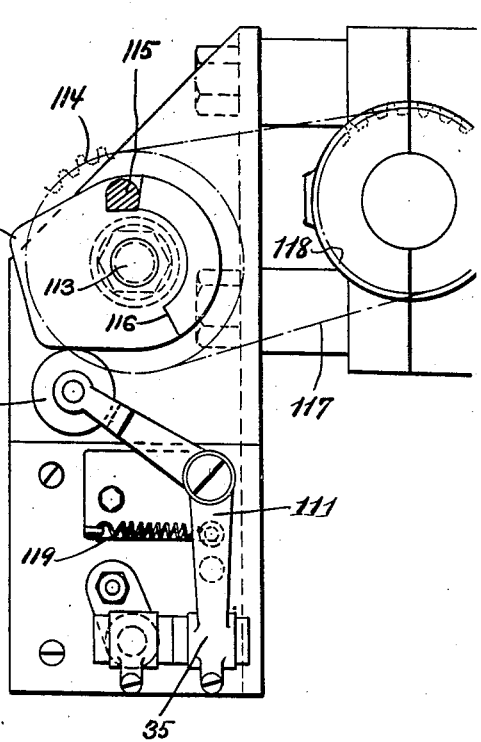

The switch 35, which is normally closed when the main valve is closed, is operated by the mechanism shown in Figs. 7 and 8. The roller 110 is carried by the switch lever 111, pivoted on a bracket or other support adjacent the main valve. 112 is a valve lever actuating cam carried on shaft 113, and 114 is a sprocket wheel for turning the cam 112 through a lug 115 engaging a larger lug 116 on the shank of the cam. The sprocket 114 is driven by a chain 117 from a similar sprocket 118 mounted on the shaft of hand rope wheel 6, so that the switch 35 will be opened and closed by the cam 112 as the main valve stem finishes its stroke. In the position shown in Fig. 8, the main valve is at center, and the elevator at rest. As soon as the main valve stem moves away from center in either direction, the lug 115 commences to travel at Fig. 8, together with sprockets 114, 118 and chain 117 away from or toward lug 116. Before the main valve has completed its movement to open position, the lug 115 strikes one side of lug 116, thereby rotating the cam 112 and opening the switch 35 as the main valve stem finishes its stroke. As long as the main valve is open, the roller 110 rests upon the high part of cam 112, maintaining the switch 35 open. When the main valve moves back to center the lug 115 travels reversely until it strikes lug 116 and rotates the cam sufficiently to allow spring 119 to close the switch 35, which occurs when the main valve is approximately at center position. If the main valve moves the other way, the lug 115 carries the cam 112 around with it until it opens switch 35, which remains open until the lug 115 moves backwardly after the closing of the valve and strikes lug 116 to close the switch 35 when the main valve is about at the center. By this mechanism, the switch 35 is normally closed when the main valve is at the center and opened when the main valve is open.

Inasmuch as the opening and closing of the main valve determines the starting and stopping of the elevator, it will be seen that the electrical starting devices will be controlled by the valve switch 35. When the cam 29 is turned upwardly in Fig. 6, to throw the electrical devices out of operation, at contacts 26 there is no danger of accidental operation of the electrical devices while the hand rope is being used. When the clutch ring 20 engages the stop buttons 15 or 16, it will be seen that the hand rope is locked between these two buttons, so that it cannot be actuated by hand until the cam 29 is reversed so as to throw the ring 20 out of the path of the stop buttons.

In combination with the system of control heretofore described, I have provided an indicating system comprising a series of indicators at each floor L¹, L², L³, which are controlled by a traveling switch L⁴, and these indicators are supplied by wires 121, connected to wire 38, the return circuit of the indicators being through wire 85 and door switches DS, and the wire 86, so that the indicators are controlled by the switch 25. Whenever the switch 25 is closed on contacts 26 the indicators show the position of the car (unless a door be open) and no indication is made while the car is running, but as soon as the car stops, the indicators show the location of the car in case the door switches are closed. Thus, it is automatically made known to the operators at the various floors when the car is in condition to be operated, and also the location of the car. If no indication shows on the hand of the indicators, the operators know that the car is in operation because of opening of switches 35 and 25, or else that a door is open, and an indication of the location of the car is only made when switches 35, 25 and door switches DS are closed.

Figure 4:
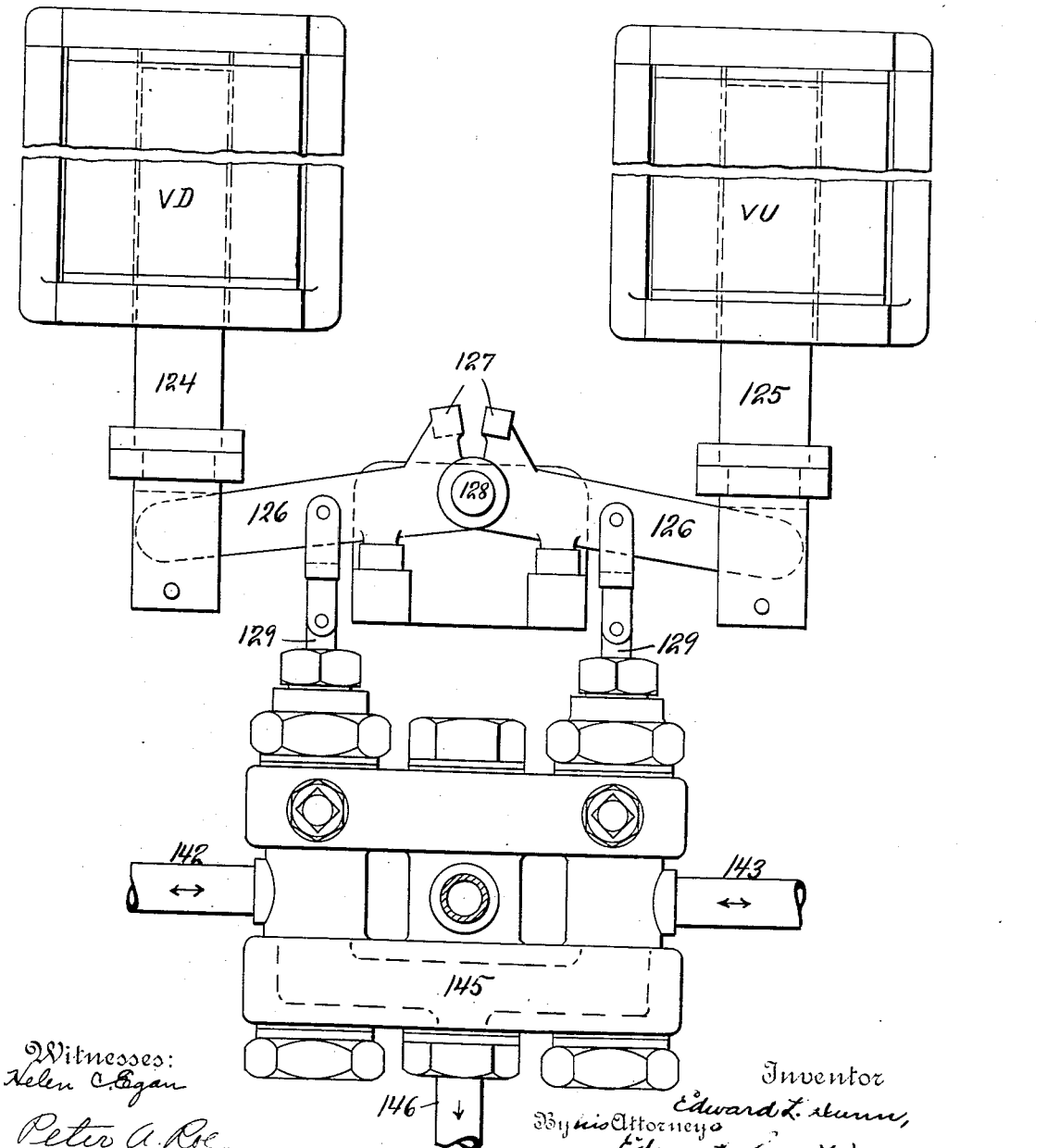
Fig. 4 represents the electrically controlled pilot valve.
Figure 5:
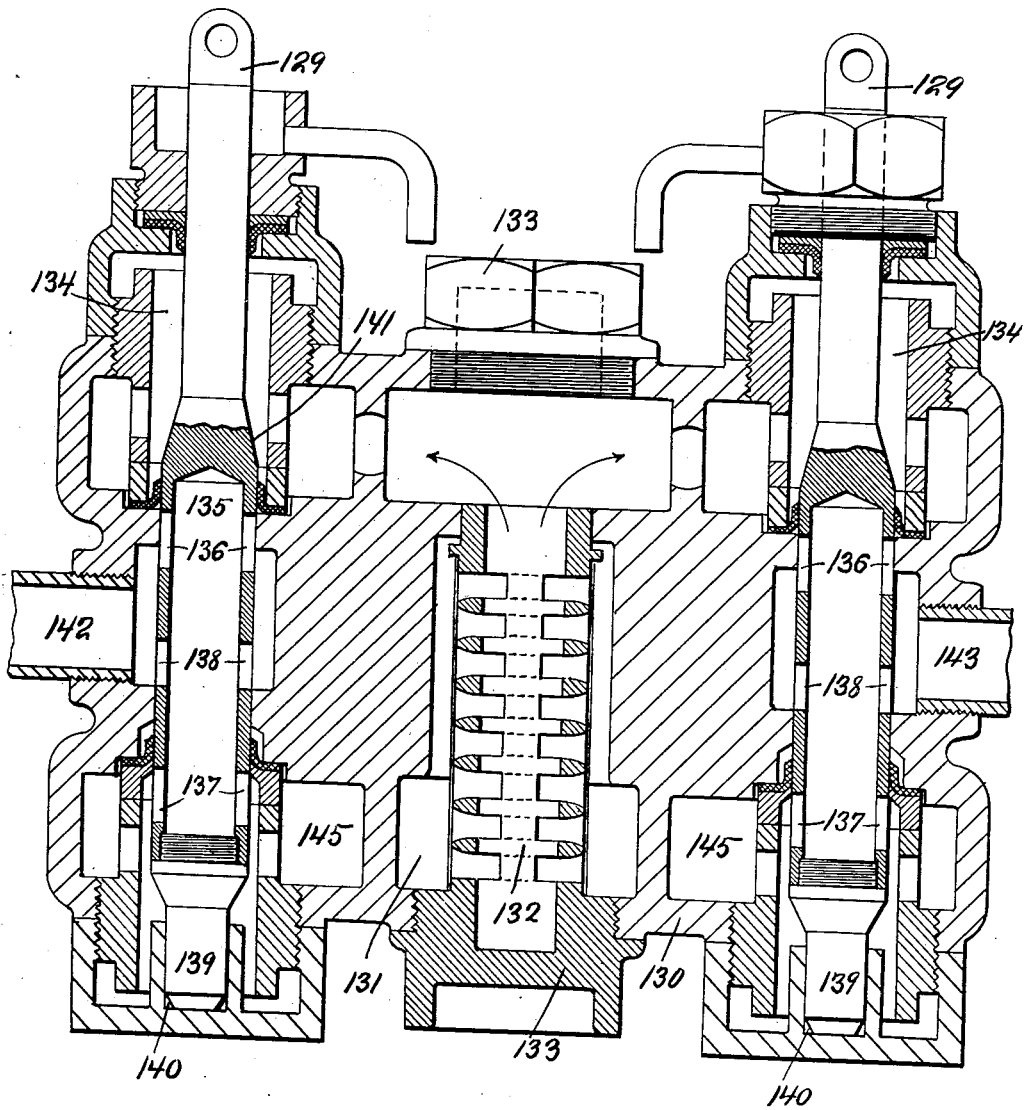
Fig. 5 represents a sectional view thereof.

The pilot valve mechanism is shown in Figs. 4 and 5, and is operated by the valve solenoids VD, VU, heretofore referred to. The cores 124, 125 are connected to levers 126, 126 respectively, pivoted at 128 and having stops 127 which prevent lifting of one solenoid (and opening of the valve)

when the other valve is open. The levers 126, 126 are connected with valve stems 129, and a description of one valve will suffice for the other as they are of the same construction. The valve casing 130 is provided with a central supply passage 131 containing a strainer 132 and closed by plugs 133. From the supply the water passes upward to right or left to valve chambers 134, in which the valve stems 129 work. The valve stems 129 are hollow as at 135 and contain ports 136, 137, 138. The lower portion of the valve stem 129 fits into a dashpot 140 which cushions the closing movement of the valve, the valve being closed by the supply pressure on the coned portion 141 of the stem 129 when the solenoid is deënergized. 142, 143 are to and from pipes leading from the opposite sides of the pilot valve to the main valve motor cylinder 144. 145 is an exhaust passage in the valve casing which discharges into an exhaust pipe 146.

When the lefthand valve stem 129, for instance, is lifted, supply pressure will pass through ports 136 and 138 to pipe 142, at the same time the other side of the motor cylinder is open to the exhaust through pipe 143, ports 138 and 137, and consequently the supply pressure pipe 142 will move the motor piston and thereby the main valve in the proper direction. When the solenoid is deënergized, the supply pressure on the coned portion 141 will automatically close the pilot valve, it being seen that when the pilot valve is closed on both sides, both sides of the motor cylinder are open to exhaust, which permits free manual operation of the main valve through the rack and pinion when desired, and also permits the motor piston to be moved when the main valve is mechanically closed, as hereinbefore described.

It is thought that the nature, objects and advantages of the invention will be fully understood from the foregoing description, and it will be seen that I have provided a system of elevator control which can be applied to any number of stops and to various kinds of motors without departure from the scope of the invention. It will also be seen that I have provided a system which is not liable to get out of order and which is safe, reliable and free from interference between the automatic controlling devices and the manual controlling devices. By reason of the mechanical closing of the main valve by the momentum of the car or other moving part, the stops can be very accurately made, and also be free from shock and jar. It will also be seen that the change from automatic to manual control is made simply by the operation of the cam 29, and that thereby the electric controlling means is thrown completely out of operation. While only three stops have been shown herein, I do not wish to be restricted thereto, as any number may be used. In case but two stops are used, it is obvious that the stopping mechanism will be somewhat simplified, inasmuch as the automatics DA and UA can be used to effect the stops instead of the traveling contactor employed for intermediate stops. Various other modifications and changes in the details may be made without departing from the scope of the invention.

Having thus described my invention I declare that what I claim as new and desire to secure by Letters Patent is:—

1. The combination with a hydraulic hoisting motor, of a main valve, electrically controlled means for opening said main valve, means for mechanically closing the main valve, and electrically controlled means for coupling said means to the motor, said electrically controlled coupling means being carried by a moving part and a switch for preventing operation of said valve opening means until the hoisting motor has come to rest.

2. The combination of a car, a main valve, electrical means for opening said valve to start the car, and means for effecting a stop comprising devices for mechanically connecting the valve and the moving car, and manual means for rendering said devices inoperative.

3. The combination with a hydraulic hoisting motor, of a main valve, electrically controlled means for opening said main valve, said means being controllable from a plurality of stations, means for rendering said stations inoperative to control the car upon actuation of the starting means at any station, means for mechanically closing the main valve, electrically controlled means for coupling said means to the motor, said means being carried by a moving part, and a switch for rendering said electrical valve opening means inoperative until said main valve has been closed.

4. The combination with a hydraulic elevator cylinder, of a controlling valve, means for opening said valve to start the car, and means for closing said valve to stop the car comprising a rope adjacent the car and connected with the valve, a clutch on the car adapted to engage the rope, means for actuating said clutch at a predetermined time to engage the moving car and the rope to close the valve, and means for manually controlling said clutch.

5. The combination with a hydraulic elevator cylinder, and a main valve, of motor means for opening said valve, an unbalanced pilot valve for controlling said motor means, selective electrical means for opening said pilot valve and holding it open until a predetermined time, means for automatically opening the electrical holding means, electrically controlled means for connecting the main valve mechanically with the car to effect a stop upon release of said holding means, and means preventing opening of said pilot valve until the main valve has been closed.

6. The combination with a hydraulic elevator cylinder, and a main valve, of electrically controlled means for opening said valve in either direction from closed position, means automatically opening the controlling circuits at a predetermined point while the valve is open, means for closing the valve to effect a stop, and means preventing operation of said valve opening devices until the valve has been closed.

7. The combination with a hydraulic elevator cylinder, and a main valve, of a circuit having electrically controlled means for opening said valve, electrical devices for effecting mechanical closing of said valve by the momentum of the car including means for rendering said devices operative at a predetermined point in the travel of the car to partially restore the starting circuits, and means controlled by the main valve for completely restoring said starting circuits.

8. The combination with an elevator controlling valve, of manual and power means for opening said valve, and means for rendering one of said valve opening means ineffective when the other is effective.

9. The combination with an elevator controlling valve, of manual and power means for opening said valve, and means on the car for rendering one of said valve opening means ineffective when the other is effective.

10. The combination with an elevator cylinder, a car, a main valve, and a pilot valve held open against a closing force for opening the main valve to start the car, of a rope connected to the main valve and disposed adjacent the path of the car, buttons on said rope corresponding to a plurality of floor stops, a thimble carried by the car through which said rope and buttons normally pass, and electrically controlled automatic means carried by the car for preventing passage of a button to stop the car at a predetermined point, by mechanically closing the main valve, means for releasing the holding force on the pilot valve, and a restoring contact for starting controlled by the main valve.

11. The combination with an elevator cylinder, a main valve, and a car, of motor means for opening said valve, a pilot valve for starting said motor, a solenoid for opening said pilot valve to admit pressure to the valve motor, means for deënergizing said solenoid to close the pilot valve, means for effecting mechanical closing of the main valve by the momentum of the car, and means carried by the main valve for restoring the circuit of said solenoid when the valve is closed.

12. The combination with a valve, of electrical and manual controlling means therefor, means controlled by said electrical means for locking said manual means against operation when the car is at rest, and means for cutting out the electrical means and simultaneously releasing said lock.

13. The combination with a valve, of electrical and manual controlling means therefor, and means rendering at least one of said controlling means inoperative to start the car.

14. The combination with a valve, of electrical and manual controlling means therefor, and means on the car and controllable by the operator for rendering at least one of said controlling means inoperative to start the car.

15. The combination with a valve, of electrically controlled motor means for opening said valve, means for setting said electrical valve controlling means for another start and for effecting a mechanical connection between a moving part and said valve to close it, and means preventing further operation of said electrical valve opening means until said valve has been mechanically returned to a predetermined closed position.

16. The combination with a main valve or the like, of a car, means for manually opening and closing said valve, a motor for also opening said valve, pilot valve mechanism for controlling said motor to open said main valve in either direction from closed position, stopping means including means for mechanically coupling the main valve to the moving car to close the valve, and a single means for rendering one of said starting means operative and the other inoperative.

17. The combination with a valve, of electrical means for controlling said valve to both open and close it, and a switch in the circuit of said controlling means mechanically connected with said valve to be closed only when said valve is closed.

18. The combination with a valve, of electrical means for controlling said valve to both open and close it, and a switch in the circuit of said controlling means including lost motion means mechanically connected with said valve to be closed only when said valve is closed.

In testimony whereof I affix my signature, in presence of two witnesses.

EDWARD L. DUNN.

Witnesses:
C. FORREST WESSON,
E. M. ALLEN.